Oct. 7, 1969   J. H. RISEBOROUGH   3,471,187
PANEL JOINTS

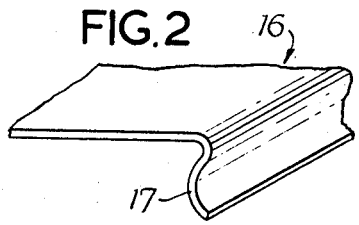
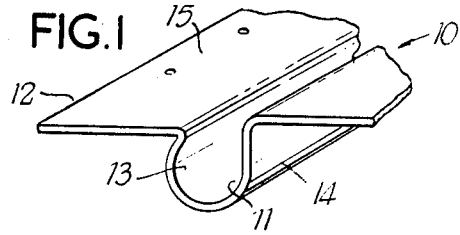
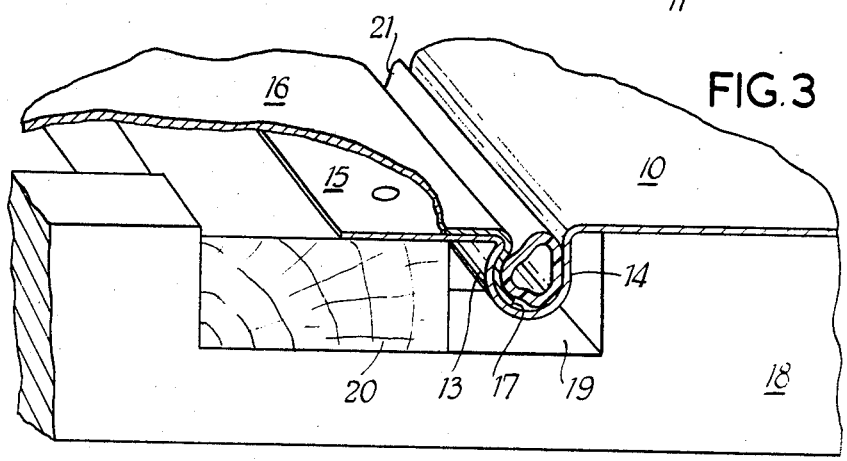
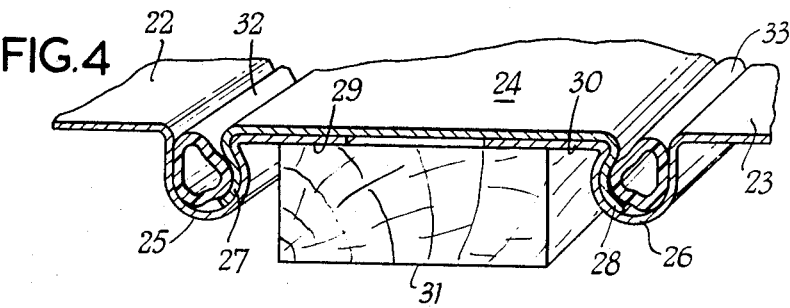
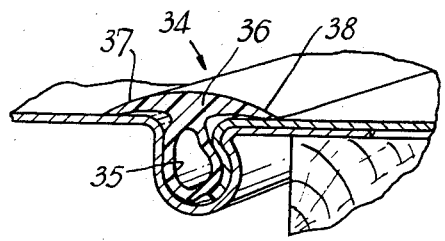

Filed Jan. 9, 1968   2 Sheets-Sheet 2

INVENTOR
John Henry Riseborough
by Wilson & Fraser
Attorney.

United States Patent Office 3,471,187
Patented Oct. 7, 1969

3,471,187
PANEL JOINTS
John H. Riseborough, The Chestnuts, Moulton,
Newmarket, Suffolk, England
Filed Jan. 9, 1968, Ser. No. 696,582
Claims priority, application Great Britain, Jan. 10, 1967,
1,275/67
Int. Cl. E04b 2/72; E04c 2/00
U.S. Cl. 287—189.36                                    7 Claims

ABSTRACT OF THE DISCLOSURE

A panel joint comprising two panels, which may be thin sheet metal panels or prefabricated insulation panels, in which one of the panels is formed, adjacent an edge with a channel and the other panel has a flanged edge which is located in the channel. The wall of the channel adjacent the said edge of the said one panel is undercut, the flanged edge of the other panel is complementary in shape to the undercut wall of the channel and a resilient insert is located in the channel under compression to clamp the flanged edge of the other panel against the undercut wall of the channel and form a weatherproof seal between the two panels.

---

The present invention relates to an improved panel joint which is suitable for joining together and sealing thin sheet metal panels, for instance, sheet metal panels forming the inner or outer skin of a caravan, or alternatively prefabricated insulating panels.

Hitherto, it was known to form the adjacent edges of two panels with interlocking flanged portions. The flanges were part-cylindrical and one was sprung into place in the other. The flanges thus served to hold the two panels together but the joint was not effectively sealed, the joint was difficult to release without damaging one or other panel and provided no means for concealing the manner in which the panels were secured to a supporting framework.

It is an object of the present invention to eliminate these disadvantages and more particularly to provide a panel joint which is weatherproof, which eliminates any surface projections, which hides the means by which the panels are fixed to their supporting framework and which is releasable without damage to the panels.

According to the invention, there is provided a panel joint comprising a first panel having an outer surface and a channel in the outer surface adjacent one edge of the panel, a side wall of the channel adjacent the said one edge of the first panel being undercut, a second panel overlying the said one edge of the first panel and having one edge bent out of the plane of the second panel, approximately at right angles, to form a flange which is complementary in shape to the said side wall of the channel and which is located in the channel against the said side wall, and a resilient insert located in the channel under permanent compression to clamp the flange against the said side wall and form a seal at the joint.

According to a further aspect of the invention there is also provided a panel joint comprising two panels in edge to edge abutment, each panel being formed in its outer surface and adjacent the abutting edge with a channel, the side wall of the channel which is located adjacent the abutting edge being undercut, a flat cover strip the longitudinal edges of which are bent out of the plane of the strip to form flanges which are complementary in shape to the said side walls of the channels and which are located in the channels against the said side walls with the cover strip located across the abutting edges of the two panels and a resilient insert located in each channel under compression to clamp the flanges of the cover strip against the said side walls of the channels.

Figure 6:
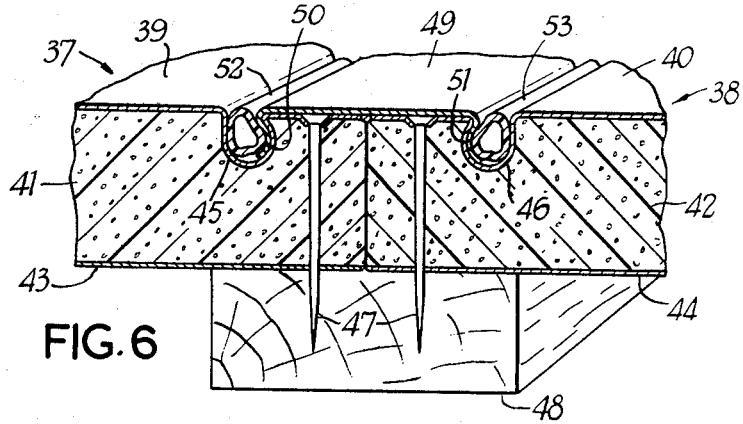
Figure 7:
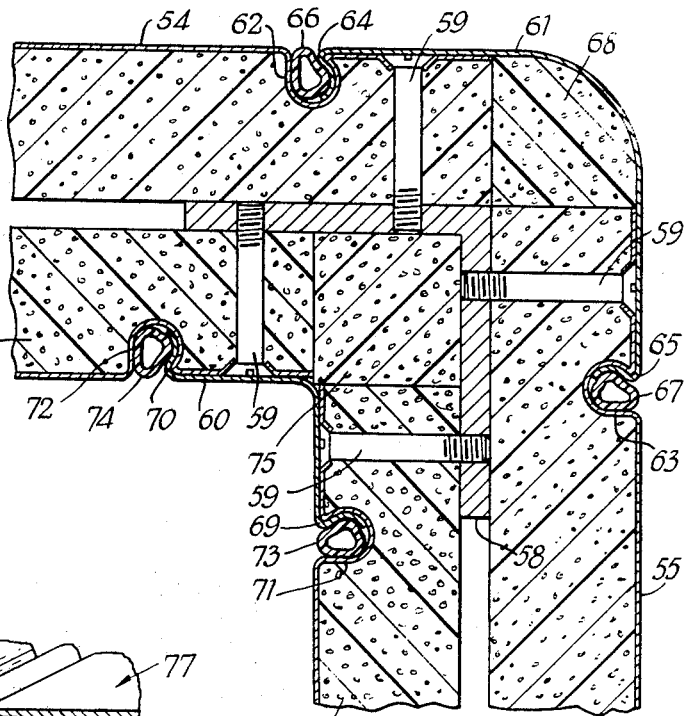
Figure 8:
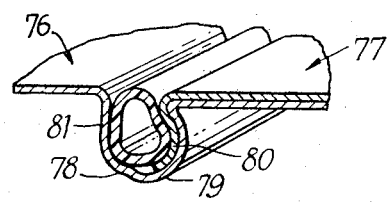

Preferred forms of the invention are described below with reference to the accompanying drawings, in which:

FIGURE 1 is a perspective of a part of a panel,
FIGURE 2 is a perspective of part of another panel,
FIGURE 3 is a perspective, partly broken away, of one panel joint according to the invention and utilising the panels of FIGURES 1 and 2,
FIGURE 4 is a perspective of a further panel joint according to the invention,
FIGURE 5 is a perspective of a panel joint incorporating an alternative form of insert to that used in the joints of FIGURES 3 and 4,
FIGURE 6 is a perspective, partly in section, through a further panel joint according to the invention,
FIGURE 7 is a section through a right angled panel joint incorporating two panels similar to those shown in FIGURE 6, and
FIGURE 8 is a section through a panel joint similar to the joint of FIGURE 3 but with one of the panels modified.

In FIGURE 1 a panel is indicated generally at 10, the panel 10 being formed from a sheet of aluminium and having a longitudinally extending channel 11 formed adjacent to, but spaced from an edge 12. The channel 11 is formed with a part-cylindrical undercut wall 13 and a flat facing wall 14, the part-cylindrical wall 13 being joined to a flat edge portion 15 of the panel which lies in a plane parallel to the plane of the remainder of the panel but spaced therefrom by approximately the thickness of the sheet material.

FIGURE 2 illustrates a panel 16 one edge portion of which is bent downwardly and bowed to form a part-cylindrical flange 17 which is complementary in shape to the undercut part-cylindrical wall 13 of the channel 11 in the panel 10.

In order to joint the panels 10 and 16 together and attach them to a supporting framework 18, as shown in FIGURE 3, the panel 10 is laid against the framework 18, with the channel 11 located in a recess 19 and the edge portion 15 nailed or otherwise secured to a cross-strut 20. The panel 16 is then laid over the edge portion 15 with the flange 17 located in the channel 11 against the complementary wall portion 13. Finally a resilient, tubular insert 21 is forced into the channel 11 where it is permanently under compression and deformed thereby clamping the flange 17 against the wall 13 and resisting withdrawal of the flange from the channel. The insert 21 need not be tubular but must be sufficiently resilient that it can be forced into the channel and thereafter expand to clamp the flange 17 in place and form an effective seal at the joint between the two panels.

The panels 10 and 16 are similar, each being formed with a channel at one end and a flange at the other end and a series of panels are attached to the framework 18 and jointed together in overlapping relationship.

In an alternative embodiment of the invention, which is illustrated in FIGURE 4, a joint between two panels 22 and 23 is sealed and hidden by a cover strip 24. Each panel 22 and 23 is formed with a channel 25 and 26 respectively, which are similar to the channel 13 in the panel 10 of FIGURE 1, and the cover strip 24 is formed with curved flanges 27 and 28. Edge portions 29 and 30 of the panels 22 and 23 are nailed to a support strut 31 and the flanges 27 and 28 of the cover strip 24 are located in the channels 25 and 26 respectively. Resilient, tubular inserts 32 and 33 are then forced into the channels 25 and 26 respectively to secure the cover strip 24 to the panels and form a seal at the joint between the two panels.

The cover strip 24 can be made of any suitable material, such a synthetic plastics or aluminium, and serves with the inserts 32 and 33 to seal and hide the joint between the two panels.

FIGURE 5 illustrates a modified form of insert for use with any form of joint according to the present invention. The resilient insert 34 of FIGURE 5 comprises a compressible portion 35 which is located in the joint under compression and a T-shaped portion 36, the flanges 37 and 38 of which are flattened against the outer surface of the two panels on either side of the joint. The insert 34 gives a finished appearance to the joint and the flanges 37 and 38 prevent water from collecting and standing in the grooves formed on either side of the insert 21 of FIGURE 3.

In FIGURES 1 to 5 the panels jointed together are formed from relatively thin sheet material. It is however advantageous to joint relatively thick panels, for instance insulation panels, together in accordance with the present invention, as shown in FIGURES 6 and 7.

In FIGURE 6, two prefabricated insulation panels are indicated generally at 37 and 38. Each panel 37 and 38 comprises a relatively thin, rigid outer skin 39 and 40 respectively, a mat of insulating material 41 and 42 respectively which is adhered to its outer skin, and an inner covering 43 and 44 respectively which may for example be a vinyl material.

The outer surface of each panel is formed adjacent to but spaced from an edge of the panel, with a channel 45 and 46 respectively. Each channel 45 and 46 is similar to the channel 11 in the panel 10 of FIGURE 1. The two panels 37 and 38 are butted against each other and attached, by nails 47, to a support strut 48 and a cover strip 49 is then secured over the joint between the two panels.

The cover strip 49 is similar to the strip 24 of FIGURE 4 and is formed with flanges 50 and 51 which locate in the channels 45 and 46. In order to complete the assembly and seal the cover strip 49 against the panels two inserts 52 and 53 are forced into place into the channels 45 and 46.

When the inserts are in place the joint between the panels 37 and 38 is sealed and hidden and the two panels are butted against one another so that there is no break in the insulation.

Preferably, the outer surface of each panel 37 and 38 located between the channels 45 and 46 and the adjacent edges of the panels is set down, relative to the remainder of the panel surface, by the thickness of the material of the cover strip, so that the outer surface of the cover strip is flush with the outer surfaces of the two panels.

In FIGURE 7, four prefabricated panels 54, 55, 56 and 57 which are similar to the panels 37 and 38 of FIGURE 6, are attached to a vertical corner strut 58 to form a cavity wall, the panels 54, 55 forming the outer wall and the panels 56, 57 forming the inner wall.

The four panels are attached to the vertical strut 58 by screws 59 and the corner joint is sealed and hidden, on the inside surface, by a cover strip 60 and on the outer surface by a cover strip 61.

The panels 54 and 55 are formed with channels 62 and 63 respectively and the cover strip 61 is provided with flanges 64 and 65 which locate in the channels 62 and 63 respectively. Inserts 66 and 67 are compressed in the channels 62 and 63 to secure the cover strip 61 in position and seal the joint. The cover strip 61 is bowed about a large radius, to give a curved outward appearance to the corner joint, and a corner strip 68 of insulating material is located beneath the cover strip 61 substantially filling the gap formed between the adjacent edges of the panels 54 and 55 and forming a continuous depth of insulation around the outside wall of the joint.

The joint between the panels 56 and 57 is hidden and sealed in a similar manner by the cover strip 60 which is formed with flanges 69 and 70 engaged in channels 71 and 72 respectively. Each channel 71 and 72 is sealed by a resilient insert 73 and 74 respectively, the inserts being compressed in the channels to secure the cover strip 60 in position and seal the joint. A corner strip 75 of insulating material is located between the ends of the panels 56 and 57 and the vertical strut 58 to form a continuous depth of insulation around the inside wall of the joint.

In some applications it is desirable to form the wall of the channels in one of the panels with a recessed portion to accommodate the flange of the other panel or the cover strip. This modification is illustrated in FIGURE 8, in which two panels are indicated generally at 76 and 77. The panel 77 is similar to the panel 16 of FIGURE 2 and the panel 76 is similar to the panel 10 of FIGURE 1 except that it is formed with a channel 78 having a recessed portion 79 which accommodates a flange 80 of the panel 77. The inner surface of the flange 80 is approximately flush with the inner surface of wall 81 of the channel and the seal created by resilient insert 82 is improved. The formation of the recessed portion 79 in the channel 78 is particularly useful when the sheet material from which the panels are made is relatively thick and it is desirable to reduce the radius on the channel to a minimum.

All of the panel joints described above can be quickly and easily broken without damage to the panels, for instance should it be necessary to replace one of the panels. In order to break the joint the resilient insert is drawn out of the channel and the flange on one of the panels or on the cover strip, as the case may be, is removed from the channel. The panel or panels are then removed from the supporting framework for replacement or repair.

The panel joint of the present invention thus provides a method of jointing two panels together which is weatherproof, which can be easily broken and remade, which conceals the joint and the means by which the panels are secured to the supporting framework and which leaves a substantially smooth external surface. The present invention is also applicable to prefabricated insulation panels and in this case provides a joint in which there is no gap between adjacent panels and the insulating barrier is unbroken.

With reference to the foregoing description, it is to be understood that the disclosure relates only to preferred embodiments of the invention and is illustrative rather than restrictive in nature; and that the invention is best described in the following claims.

What I claim is:

1. A panel joint comprising two similar structural panels each of which has a planar outer surface and two generally parallel edges, a channel in the outer surface adjacent one edge of the panel, a side wall of the channel adjacent the said one edge being undercut and part-cylindrical, an edge portion between the said one edge and the said channel which is arranged to lie in a plane parallel with the remainder of the channel but spaced therefrom by a panel thickness, and a flange along the other edge of the panel which is bent downwardly and shaped to complement the side wall of the channel, the edge portion of each of the panels being attached to a support structure with the flange of the other panel located in the channel of the one panel against the said side wall and a resilient insert located in the channel under permanent compression to form a seal at the joint.

2. A panel joint as claimed in claim 1, wherein the other side wall of the channel is approximately flat and disposed at right angles to the general plane of the first panel.

3. A panel joint as claimed in claim 2, wherein the resilient insert comprises a tubular strip of synthetic plastics material.

4. A panel joint comprising two structural panels in edge to edge abutment, each panel being formed in its outer surface and adjacent the abutting edge with a channel, the side wall of the channel which is located adjacent the abutting edge being undercut, a flat cover strip the longitudinal edges of which are bent out of the plane of the strip to form flanges which are complementary in shape to the said side walls of the channels and which are located in snap-engagement in the channels against the said side walls with the cover strip located across the abutting edges of the two panels and a resilient insert located in each channel under compression to seal the flanges of the cover strip against the said side walls of the channels.

5. A panel joint as claimed in claim 4, wherein each panel comprises an outer skin of relatively rigid material and a layer of insulating material adhered to the outer skin, the insulating material of the two panels being in face to face abutting relationship.

6. A panel joint comprising two structural panels secured to a rectangular section supporting framework at right angles to one another, each panel being formed in its outer surface, adjacent one edge of the panel, with a channel, the side wall of the channel which is located adjacent the said one edge of the panel being undercut, a cover strip comprising two similar portions at right angles to one another, the outer edge of each portion being bowed to form flanges which are complementary in shape to the undercut side walls of the channels, and which are located in snap-engagement in the channels against the said sidewalls, and a resilient insert located in each channel under compression to seal the flanges of the cover strips against the walls of the channels.

7. A panel joint as claimed in claim 6, wherein each panel comprises an outer skin of relatively rigid material and a layer of insulating material adhered to the outer skin and wherein a square section length of insulating material is located beneath the cover strip and between the adjacent edges of the two panels.

References Cited

UNITED STATES PATENTS

| | | | |
|---|---|---|---|
| 2,180,504 | 11/1939 | Bradfield et al. | 52—588 |
| 2,405,643 | 8/1946 | Crot | 52—471 X |
| 3,070,646 | 12/1962 | Lindgren | 52—277 X |
| 3,143,165 | 8/1964 | Lewis et al. | |
| 3,187,801 | 6/1965 | Saling | 160—392 |
| 3,282,613 | 11/1966 | Axelsonn | 52—471 X |
| 3,320,706 | 5/1967 | Elliott et al. | 52—471 X |
| 3,363,383 | 1/1968 | La Barge | 52—471 |

FOREIGN PATENTS 1,467,214  12/1966  France.

RAMON S. BRITTS, Primary Examiner

U.S. Cl. X.R.

52—277, 463, 471, 584